United States Patent [19]

Ivy

[11] 4,292,572
[45] Sep. 29, 1981

[54] METHOD AND APPARATUS FOR REGULATING ELECTRIC MOTOR ARMATURE CURRENTS

[75] Inventor: Joel G. Ivy, Marion, Ohio
[73] Assignee: Dresser Industries, Inc., Dallas, Tex.
[21] Appl. No.: 60,761
[22] Filed: Jul. 26, 1979
[51] Int. Cl.³ ............................................. B61C 15/08
[52] U.S. Cl. ....................................... 318/52; 318/71; 318/81
[58] Field of Search ..................... 318/52, 99, 100, 98, 318/45, 51, 68, 69, 70, 71, 77, 81, 84, 34, 80

[56] References Cited

U.S. PATENT DOCUMENTS

| | | | |
|---|---|---|---|
| 2,930,958 | 3/1960 | Schaufuss | 318/70 |
| 3,577,048 | 5/1971 | Nordin | 318/81 X |
| 3,611,079 | 10/1971 | Ivey | 318/45 X |
| 3,688,167 | 8/1972 | Ivey et al. | 318/45 |
| 3,789,280 | 1/1974 | Oldfield | 318/45 |
| 4,164,872 | 8/1979 | Weigl | 318/52 X |

*Primary Examiner*—Ulysses Weldon
*Attorney, Agent, or Firm*—Peter N. Lalos

[57] ABSTRACT

A method and apparatus are described for regulating the armature currents of a plurality of electric motors connected to share the same load, but having separate power sources. The described method and apparatus thereby operate to enhance the load-sharing characteristics of these motors. Each of the motors is provided with armature currents by a separate generator set so that each motor is connected in an individual Ward-Leonard type system. The fields of each of the motors are excited separately from the aforementioned separate power sources. The armature currents for each of the motors are individually sensed, and values corresponding to the armature current values are derived. The latter analog values are compared with an average value for all of the armature currents. When a difference or error signal occurs for a given armature current value as a result of the foregoing comparison, the field excitation for the corresponding motor is regulated to produce an armature current value which will approach or be substantially the same as the aforementioned average value. By this means, each of the plurality of motors is caused to have an armature current of substantially the same value as the armature currents of the other motors driving the same load.

8 Claims, 1 Drawing Figure

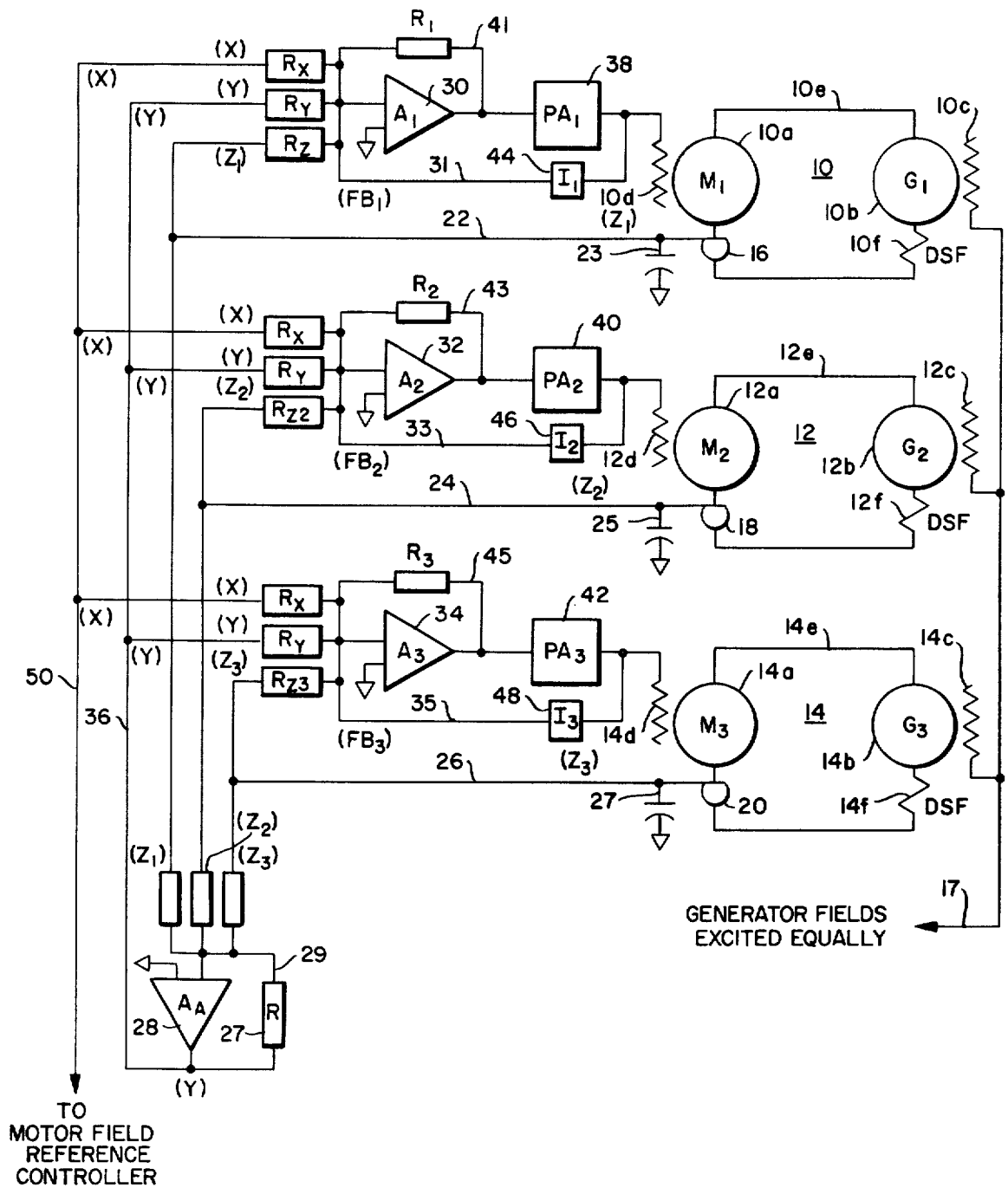

METHOD AND APPARATUS FOR REGULATING ELECTRIC MOTOR ARMATURE CURRENTS

BACKGROUND OF THE INVENTION

This invention relates to a method and apparatus for regulating the armature currents of a plurality of motors driving the same load so that the motors are caused to operate at substantially the same speeds and load division among the motors is substantially equalized.

There are a variety of applications wherein a plurality of motors are required to drive a common mechanical load; examples of such applications occur in excavating machines wherein a variety of motions such as swing, hoist, drag or crowd might be so driven. However, the application of this invention is not restricted to excavating machinery.

It is theoretically possible that initially any load can be driven by a single motor assuming that motor could be constructed to have a sufficient horse power value to operate the load. For very large loads such motors would be excessively large, and, therefore, have a large inertia mass. In order to overcome such inertia mass problems and enable faster acceleration and deceleration it is common to use several smaller motors, instead of the single motor, the totality of the smaller motors possessing the requisite power for driving the load in question. The use of a plurality of motors in this fashion produces other advantages including reduction of gear stresses and providing for the possibility of continuation of operation should a single motor fail.

When a plurality of motors are connected in common to a given load, it is necessary that the motors have the same rotational speeds. Prior art demonstrates a number of ways for regulating the speeds of such motors relative to each other to produce the requisite sameness, but these prior art techniques have serious disadvantages.

The traditional technique for providing control or regulation of load sharing motors of the direct current variety which, as stated, must run at the same speed to ensure proper load sharing, is through the use of a so-called "sandwich series" circuit. In such a circuit the motors and generators provided for producing the armature currents for the motors are connected alternately in series in a loop. There is a source of excitation for each motor field and a separate source of equal excitation for each generator field. This arrangement is commonly used because it produces excellent load division between the individual motors. However, a serious disadvantage results in this system because it permits torsional oscillation at resonant frequencies which lie in the operating range of the mechanism in question. Clearly, these oscillations are undesirable since they increase the loads on gearing.

The conventional "sandwich series" circuit is relatively incapable of damping oscillations between the motors. Such oscillations can reach such a severity that a phase angle between them of 180° is produced, i.e., in a given two motor system the first motor is at the maximum speed excursion above a mean value and at the same time the second motor is a minimum speed below the latter mean value. The reason for this state of affairs is that the counter electromotive forces (cemf) produced by the motors are additive, and the excursions in the cemf are complimentary. The excursions exactly cancel each other, when the aforementioned 180° phase displacement occurs, and the total voltage around the loop circuit is unaffected by the oscillations. Accordingly, the loop currents cannot change in a direction to permit the development of damping torques.

In order to improve the aforementioned situation it is known that if the motors in a given system are powered separately, i.e., are parts of separate individual Ward-Leonard type loops, the generators will be able to provide damping for the torsional oscillations of the drive system. In such an arrangement the motor speed variations would cause variations in the cemf which, when compared to a relatively stable generator voltage, causes substantial changes in armature current which damp the oscillations.

The use of individual loops as mentioned immediately above, however, have been thought to be less satisfactory from a load division viewpoint. It is known in the prior art that the common load drive system of the type wherein each motor has its own individual power source needs to be regulated in some fashion to insure proper load division. An attempt at a solution of this problem is discussed, for example, in U.S. Pat. No. 3,688,167. The latter patent describes a system wherein each generator field is separately excited, and this excitation is separately regulated for adjusting the speed of each corresponding motor. The armature currents for each of the motors are compared with a master value which is derived from the armature current of a master motor. Those motor generator sets which have armature currents which deviate significantly from the master value are regulated in the usual manner by adjusting the generator field voltage to correspondingly adjust the speed of associated motor. This system has significant disadvantages in that significant errors in the division can occur which will not be corrected for periods of time which are far too long. Furthermore, this arrangement does not significantly improve the torsional oscillation problem discussed above.

It is, therefore, an object of this invention to provide a method and apparatus for regulating the armature currents of electric motors which are required to drive a common load so that they will operate at substantially the same speeds providing optimal load division among the motors while substantially removing torsional oscillation in the system.

SUMMARY OF THE INVENTION

The foregoing and other objects are achieved according to the invention in a form of regulation wherein each armature current value for each motor is compared with an average value for all the motors. Should a given armature current value differ the speed of the corresponding motor is adjusted in accordance with that difference.

More particularly, it is contemplated that each, for example, direct current motor will be connected in a Ward-Leonard type loop. The root mean square (RMS) currents in each of the loops are sensed and, respectively, compared with an average value of the RMS current for all the loops. The regulator then makes some small changes in the motor field strengths to cause the RMS currents in those motors to be substantially equal to the above RMS loop current.

BRIEF DESCRIPTION OF THE DRAWING

The principles of the invention will be more clearly understood by reference to the description of a preferred embodiment constructed and operated according to the principles of the invention as described below.

This description should be considered with the drawing which is a schematic diagram of a preferred embodiment.

DETAILED DESCRIPTION OF THE PREFERRED EMBODIMENT

In the drawing is schematically illustrated a regulating system constructed in accordance with the principles of the invention for regulating the armature currents of a plurality of direct current motors which are connected to drive a common load. The load being driven is not illustrated herein, but the load could, for example, be the swing drive on a large excavating machine. The embodiment shown comprises three Ward-Leonard loops 10, 12 and 14. In each loop, for example referring to loop 10, a direct current motor 10a has its armature connected in series by means of loop circuit 10e with the armature of a generator 10b. Like arrangements are found in the other motor-generator loops 12 and 14. Field excitation for generators 10b, 12b and 14b is provided, respectively, through shunt field coils 10c, 12c and 14c which are connected in parallel and excited equally via a line 17. Each motor shunt field 10d, 12d and 14d is excited from an individual source as will be discussed in detail below.

In order to sense the armature currents in each of the loops 10 through 14 current transducers 16, 18 and 20 are provided and connected in the loops as shown. These transducers which are of conventional construction produce an analog signal which is proportional in value to, preferably, the long-term RMS value of the armature currents in the respective loop circuits. Each transducer must be of a type which will electrically isolate its analog output signal from the loop circuit. Since RMS signals are being dealt with, polarity is of no consequence. Examples of devices which can be used as transducers include thermocouples which are heated by the loop current, thermoconverters magnetic amplifier-type transducers which use the current to saturate the magnetic core and transducer/isolation systems using operational amplifiers, electronic choppers and transformers. If needed, a shunt can be provided to convert a major portion of the loop current around the transducer. It is important that the transfer characteristics of each of the transducers be closely matched. If this criterion is met, the system will tolerate substantial errors in the preferred transfer function of the output signal proportional to the RMS loop current. Since, as will be described in greater detail below, the regulating system described herein compares one transducer output to the average output of all transducers, and any error in transfer function will appear also in the average, the regulator will function even if the transfer function is not a true RMS analog signal. In order for this system to operate properly it is only necessary that the difference between the signal of each transducer and the average of all of the signals approach zero as the respective RMS currents approach the average RMS current value.

In alternative forms transducers may be used which do not accurately measure the RMS armature current, but might, however, produce a response equal to the square of the current value or the average current. This assumes that the shape of the current-time curve of each of the armature currents is closely similar. Also, shape variations cannot be introduced by reason of rapid operation of the regulating system. If the shapes of the respective current-time curves are approximately the same other functions of the current will approach equality when the RMS values approach equality. This, accordingly, will permit the aforementioned variation in transducer characteristics used. In this connection, for example, the practical transducer might have a transfer function which provides an output proportional to the average (first power average) current but with two proportional constants. The lower proportionality constant would be effective for lower currents and the higher constant for the higher currents. This would produce a two shape linear curve generally approximating the parabolic square curve.

The preferred embodiment described herein utilizes transducers which are capable of producing an output for currents in either direction in the loop. Considering the nature and symmetry of the loading which will occur, for example, in swing operations of excavating machines, satisfactory performance can be obtained with transducers which respond to current in only one direction. In the latter form, this system operates essentially as a "sampled data" regulating system. In selecting a transducer used, it is to be remembered that the overall system configuration will be affected by the particular type of transducer selected.

As illustrated, the outputs from transducers 16, 18 and 20 issue, respectively, on leads 22, 24 and 26. Connected, respectively, across the transducer outputs are capacitors 23, 25 and 27. These capacitors should be of a sufficiently large value to significantly reduce the response time of associated transducers and insure that the output signals Z1, Z2 and Z3 appearing on leads 22, 24 and 26 have time constants which are long when compared to an operating cycle of the load or the frequency of torsional oscillations which might occur in the system. Of course, the values of the capacitors may be reduced should the transducers have relatively large response times themselves.

The respective transducer output signals Z1, Z2 and Z3 are fed by leads, 22, 24 and 26 to inputs of an operational amplifier 28. Similarly, branches of these same leads communicate each of the transducer output signals to the respectively labelled inputs of operational amplifiers 30, 32 and 34.

Operational amplifier 28 has three inputs labelled Z1, Z2 and Z3 which represent inputs of the RMS current values from each of the three loops 10, 12 and 14. The output Y of amplifier 28 alone is the sum of these three inputs. It is to be noted that amplifier 28 has a fourth input from output feedback circuit 29 containing a resistor 27. This feedback circuit provides the amplifier with a stable and finite gain in the usual manner, and it also introduces a scaling factor through judicious selection of the value of the resistor so that the sum of the inputs is averaged, i.e., in this case divided by three. Thus, output signal Y appearing on lead 36 and its branches has a value which is the average of the three signal values Z1, Z2 and Z3.

In order to perform this averaging function it is clear that the preferred embodiment an operational amplifier is provided. However, other devices can be used; these include magnetic amplifiers and rotating excitors. Furthermore, with appropriate changes in the interfacing circuits which would provide additional isolation, it could be possible to use passive resistor circuits to perform the averaging function.

The fields 10d, 12d and 14d of the respective direct current motors 10a, 12a and 14a are, respectively, energized by power amplifiers 38, 40 and 42. Each power amplifier produces an output signal adequate in power to excite the field, but having an output power which is proportional to the relatively low value in power input it receives. Suitable amplifiers for this function include thyristor-controlled rectifiers and rotating excitors.

Each power amplifier output is connected by an appropriate feedback circuit to provide a fourth input to the associated operational amplifier. For example, the output of power amplifier 38 is connected by a feedback circuit 31 to provide a fourth input to amplifier 30. The feedback signal $FB_1$ is communicated via this lead. Similarly, feedback circuits 33 and 35 are provided to communicate feedback signals $FB_2$ and $FB_3$ to, respectively, amplifiers 32 and 34. Each feedback signal is preferably proportional to the output current of the associated power amplifier, but it has been shown that voltage-proportional signals can be used.

Feedback circuits 31, 33 and 35 are, respectively, provided with isolators 44, 46 and 48, connected as shown. Isolator components should be chosen which will permit faithful reproduction of the feedback signal, but are isolated electrically from the motor field circuit. It is contemplated that the preferred embodiment described herein uses a current transformer and rectifier arrangement designed to measure the inputs to the power amplifiers. Other devices which might be used include transformer-coupled chopper amplifier arrangements and optical isolators.

As indicated, amplifiers 30, 32 and 34 receive at their respective inputs a total of four signals. Each amplifier on branches of lead 36 receives the output signal Y from amplifier 28 which represents the average value of the RMS currents in the three circuits. From branches of lead 50 each amplifier 30, 32 and 34 receives a signal X which represents a reference signal having a value corresponding to the desired motor field current for a given mechanical speed and load requirement without regard to any load sharing requirement. It is to be noted that input X is the largest input in value, and can be as much as five (5) to twenty (20) times greater than the value of signal Y. Each of the amplifiers 30, 32 and 34 receives a third input signal corresponding to the RMS value of the current in that loop with which the particular amplifier is associated. For example, amplifier 30 receives the signal Z1 which is derived from the current in loop 10. The other amplifiers receive signals Z2 and Z3 as indicated. Finally, as fourth inputs amplifiers 30, 32 and 34, respectively, receive feedback signals FB1, FB2 and FB3, each of which represents the output of the power amplifiers associated therewith and thereby represents the excitation of the associated motor.

Each of the amplifiers 30, 32 and 34 operate according to the equation $X+Y+Z+FB=0$. The relative polarities of signals corresponding to each component of the equation are that the Z and X signals are positive relative to the Y and FB signals.

Feedback circuits 41, 43 and 45 having series resistances connected therein are provided, respectively, for amplifiers 30, 32 and 34. In the usual fashion the feedback circuits provide stable and finite gain values for the amplifiers.

Each of the generators 10b, 12b and 14b are provided with individual differential series of fields 10f, 12f and 14f in addition to the above-mentioned equally excited fields. The latter differential fields provide some separate excitations for the generators which produce the desired speed-torque characteristics in the mechanical output of the motors.

It is contemplated in this preferred embodiment that all motors are electrically identical and all generators are electrically identical, of course, allowing the random variations in manufacturer tolerances. The differential series fields 10f, 12f and 14f on each of the generators produces a "drooping" volt-ampere characteristic. This is a known expedient for compensating for the variations generally found between machines of the type here in question which are supposed to be duplicates to thereby limit the error in load division to 10% to 15%. From the standpoint of commutation and mechanical torque output considerations, the latter accuracies are acceptable. It is, however, usually desired to hold the error in thermal load division to smaller values. That is, while 15% in load division is acceptable for peaks and short periods of operation, the RMS value of the armature current taken over a complete operating cycle should be equal in the several loops 10 through 14 to within a few percent. Since most electric motors and generators are thermally limited it is the RMS current that determines the required rating.

The preferred embodiment of the system described above provides a means for regulating the armature currents of a plurality of electric motors driving a common load so that the respective motors drive substantially the same loads at substantially the same speeds, i.e., the armature currents of the various motors operating the common load are balanced. As indicated this is accomplished by sensing the RMS currents in each of the loops 10, 12 and 14 and comparing them to the average value of the RMS current for all the loops. The regulating system will then operate to make small changes in the respective field strengths to cause the RMS currents in each of the loops to closely approach and substantially equal the average RMS loop current value.

It is important to note that the RMS current values on which the regulating action is based are "long term" values. In referring to long term values herein it is meant that these RMS current values should preferably be of the same order of magnitude as the motor thermal-time constant. The thermal-time constant of the motors used herein generally approximates 15 minutes. For comparison purposes the frequency of the torsional oscillations which might be experienced in a system such as this in a swing mechanical system on an excavating machine in several cycles per second; the complete excavator load cycle is thirty (30) second to one minute. It should then be clear that the system according to the invention is made to operate very slowly and can correct imbalance in thermal loading without having any effect on load response or torsional oscillation damping.

It should be noted that the foregoing description of a preferred embodiment is based on the use of electronic operational amplifiers. Other components might be used, such as magnetic amplifiers or rotating excitors.

It is contemplated that the invention can be carried out alternatively by equipping each motor with two fields, a main field and an auxiliary field. In this configuration input X would be applied directly to the main field. The output regulator system would be applied to the auxiliary field. It is conceivable that this configuration might avoid the use of power amplifiers such as amplifiers 38, 40 and 42. This possibility arises because the power needed for load division correction in such a configuration would appear to be very small.

Another alternative embodiment which is functionally equivalent but which uses different components would involve the use of motors which have but one field supplied from a single source which has been modulated by the X input. The field excitation for each motor would pass through a small series resistance capable of reducing the X excitation by a few percent. Parallel relays would be provided to progressively reduce the resistance by short circuiting of the aforementioned resistor. The relays would have successively higher pick-up values and would have their coils energized by operational amplifiers such as 30, 32 and 34. Thus, the relays could control the motor field excitations in small incremental steps in response to the outputs of amplifiers 30, 32 and 34.

It should be quite clear that the preferred embodiment of the invention described herein is considered only as being exemplary of the principles of the invention. Modifications and changes in the described circuitry will occur to those skilled in the art which will be within the scope of the invention as described in the appended claims.

I claim:

1. A method for regulating the armature currents of a plurality of electric motors to thereby damp torsional oscillations of the motors, each motor having a common load and having a separate source of excitation, comprising the steps of:
   sensing the values of the armature currents of each motor,
   deriving an average value of the sensed armature currents,
   comparing each said sensed armature current value to said average value, and
   regulating the respective excitation sources for each motor to cause the armature current for that motor to approach in value said average value.

2. A method defind in claim 1 wherein said sensing step includes producing analog signals, respectively, having values proportional to the long term root mean square (RMS) values of the armature currents.

3. The method defined in claim 2 wherein said long term RMS values are determined over a period of time in the order of magnitude of the motor thermal-time constant.

4. The method defined in claim 1 wherein said comparing step further comprises each sensed armature current value with said average value and a reference value proportional to a desired speed of operation of the motor.

5. Apparatus for regulating the armature currents of a plurality of electric motors driving a common load and each motor having a separate source of excitation, comprising:
   sensing means for detecting the values of the armature currents of each motor and for producing output signals having values, respectively, proportional thereto,
   averaging means for receiving said sensing means output signals and for producing therefrom an output signal having a value proportional to the average of the values of said sensing means output signals, and
   a plurality of regulating circuit means, one of which is coupled to provide varying excitation to each said motor, each said regulating circuit means including means for receiving and comparing the sensing means output signal for the motor associated therewith with said averaging means output signal and for producing a difference signal having a value proportional to the result of the comparison, the value of said difference signal thereby controlling the armature current of the motor connected to the regulating circuit means.

6. The apparatus defined in claim 5 further comprising an additional input to each said regulating circuit means for receiving a reference signal having a value proportional to the desired speed of operation of the motors for comparison with said averaging means output signals and said respective sensing means output signals for producing said difference signals.

7. The apparatus defined in claim 5 further comprising in each of said regulating circuit means a power amplifier for receiving a said difference signal and for producing therefrom a proportionally-valued, amplified motor excitation signal.

8. The apparatus defined in claim 7 further comprising a further input to each said regulating circuit means for receiving a feedback signal which is proportional in value to the said motor excitation signal from the said power amplifier coupled thereto.

* * * * *